(12) United States Patent
Otake

(10) Patent No.: US 10,549,609 B2
(45) Date of Patent: Feb. 4, 2020

(54) DOOR FRAME

(71) Applicant: SHIROKI CORPORATION, Fujisawa-shi (JP)

(72) Inventor: Yasuhiro Otake, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 135 days.

(21) Appl. No.: 15/798,206

(22) Filed: Oct. 30, 2017

(65) Prior Publication Data

US 2018/0117997 A1   May 3, 2018

(51) Int. Cl.
 *B60J 5/04*   (2006.01)
(52) U.S. Cl.
 CPC .......... *B60J 5/0402* (2013.01); *B60J 5/0468* (2013.01); *B60Y 2410/124* (2013.01)
(58) Field of Classification Search
 None
 See application file for complete search history.

(56) References Cited

U.S. PATENT DOCUMENTS

| | | | | |
|---|---|---|---|---|
| 2012/0174491 A1* | 7/2012 | Clark | ..................... | B60J 5/0402 49/490.1 |
| 2014/0339853 A1* | 11/2014 | Sato | ..................... | B60J 5/0402 296/146.5 |
| 2016/0031298 A1* | 2/2016 | Yoshihara | ............... | B60J 5/0402 296/146.2 |
| 2016/0167491 A1* | 6/2016 | Nakaguchi | ............. | B60J 5/0402 49/504 |
| 2016/0257183 A1* | 9/2016 | Yamazaki | ............... | B60J 5/0402 |
| 2017/0144515 A1* | 5/2017 | Makita | .................... | B60J 5/0402 |
| 2019/0143390 A1* | 5/2019 | Yamamoto | ........... | B21D 39/021 |

FOREIGN PATENT DOCUMENTS

| | | | | |
|---|---|---|---|---|
| JP | 2013-121754 A | 6/2013 | | |
| WO | WO-2014188977 A1 * | 11/2014 | ............ | B60J 5/0402 |
| WO | WO-2015156294 A1 * | 10/2015 | ............ | B60J 5/0402 |

* cited by examiner

*Primary Examiner* — Marcus Menezes
(74) *Attorney, Agent, or Firm* — McGinn I. P. Law Group, PLLC.

(57) ABSTRACT

A door frame includes: an outer joint part of an outer member and an inner joint part of an inner member are welded at a plurality of welding portion; wherein, in a cross-section orthogonal to a longitudinal direction, the inner joint part includes an inner inside surface an inner outside surface and an inner side surface, and the outer joint part includes an outer inside surface and an outer side surface; wherein, in at least one of the welding portions, an inner notch is provided at an outer edge of the inner joint part and a weld path is formed between the inner side surface and the outer side surface; and wherein a weld bead, which is formed to fill the weld path, is attached to the inner outside surface, the inner side surface, the inner inside surface, the outer side surface, and the outer inside surface.

8 Claims, 7 Drawing Sheets

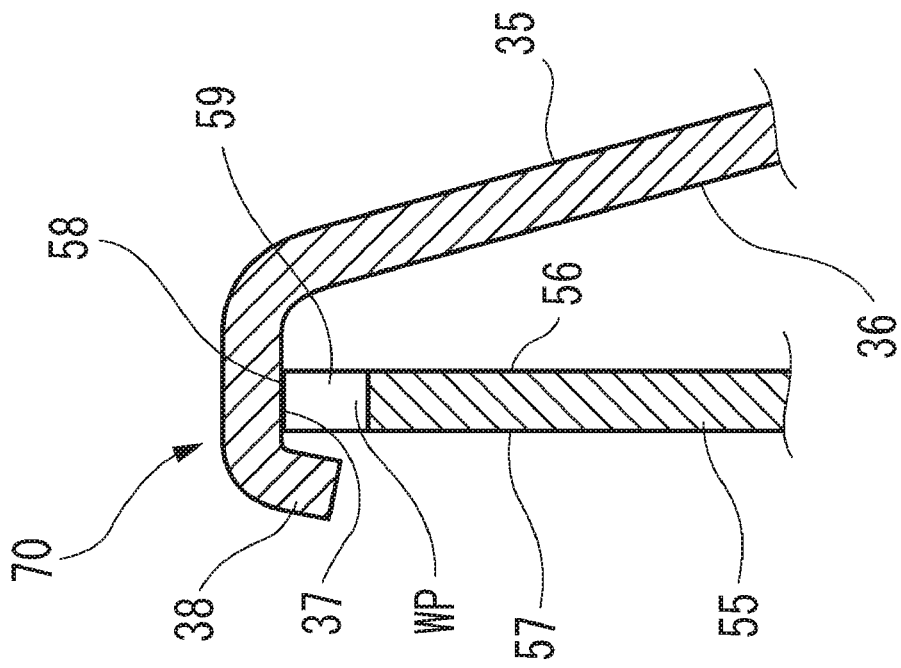
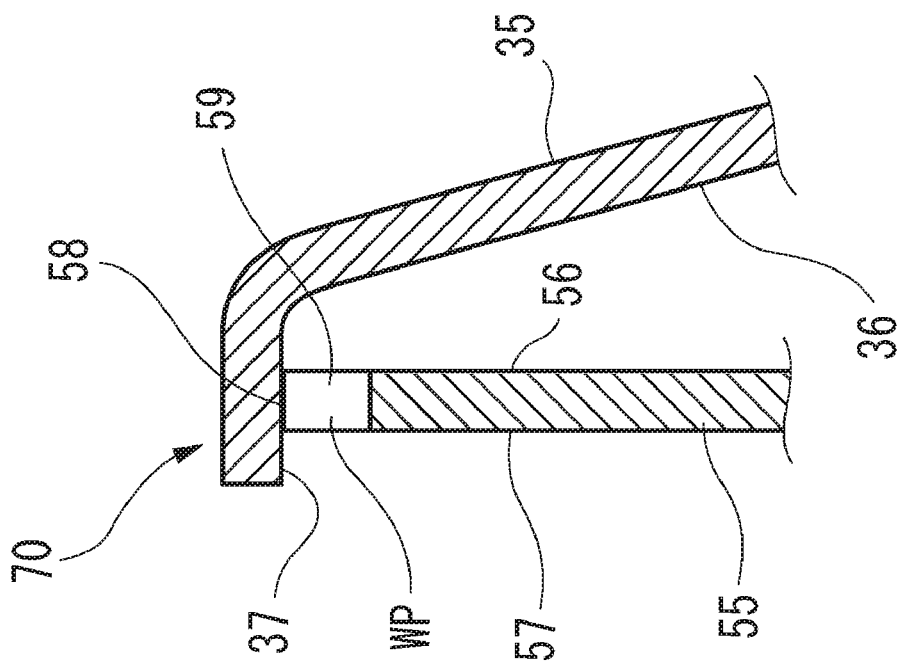

DOOR FRAME

CROSS-REFERENCE TO RELATED APPLICATION

This application claims priority from Japanese Patent Application No. 2016-215390 filed on Nov. 2, 2016, the entire subject matter of which is incorporated herein by reference.

TECHNICAL FIELD

This disclosure relates to a door frame.

BACKGROUND

There is known a vehicle door frame described in JP-A-2013-121754. The door frame has an outer member and an inner member welded to the outer member. In a welding portion, the outer member has a folded part with an opening. An edge of an extension part of the inner member is inserted into the opening of the folded part. A projection part provided at a distal end surface of the edge of the extension part is welded to the opposing portion of the folded part.

SUMMARY

In the door frame of JP-A-2013-121754, the inner member is welded to the outer member only in the apical surface of the edge of the extension part. For this reason, it is difficult to improve the weld strength of the inner member with respect to the outer member.

In this regard, this disclosure provides a vehicle door frame which has the high weld strength of an inner member with respect to an outer member.

A door frame of this disclosure have a glass run storage part storing a glass run, and the door frame includes: an outer member; and an inner member welded to the outer member, wherein an outer joint part of the outer member and an inner joint part of the inner member are welded at a plurality of welding portions along a longitudinal direction in which the glass run storage part extends; wherein, in a cross-section orthogonal to the longitudinal direction, the inner joint part includes an inner inside surface, an inner outside surface, which is positioned on an outside of the door frame than the inner inside surface, and an inner side surface, which connects the inner inside surface and the inner outside surface, and the outer joint part includes, at least, an outer inside surface, which faces the inner inside surface with a gap, and an outer side surface, which faces the inner side surface; wherein, in at least one of the welding portions, an inner notch is provided at an outer edge of the inner joint part, and a weld path, which communicates inwards from the outside of the door frame, is formed between the inner side surface and the outer side surface by the inner notch; and wherein a weld bead, which is formed to fill at least the weld path, is attached to the inner outside surface, the inner side surface, the inner inside surface, the outer side surface, and the outer inside surface.

In the door frame according to this disclosure, the inner joint part of the inner member is welded to the outer joint part of the outer member in three surfaces of the inner outside surface, the inner side surface, and the inner inside surface. Thus, it is possible to improve the weld strength of the inner member with respect to the outer member.

In the above-described door frame, the outer joint part may include an outer folded part, which is continuous from the outer side surface and extends to face the inner outside surface, and wherein, in at least one of the welding portions, the weld bead, which is formed to fill the weld path, may be attached to the outer folded part.

In the door frame according to this disclosure, the weld bead is also attached to the folded part. Thus, the weld strength of the inner member with respect to the outer member can be improved.

In the above-described door frame, in an outer edge of the outer folded part, an outer notch may be provided to be positioned to overlap with the inner notch.

In the door frame according to this disclosure, the opening of the weld path is exposed to the outside of the door frame. Thus, a welding operation can be performed easily.

In the above-described door frame, a pair of side parts forming the outer notch may be bent toward the inner outside surface.

In the door frame according to this disclosure, the pair of side parts does not protrude outward, so that the outer member is handled easily.

In the above-described door frame, a dimension of the outer notch in the longitudinal direction may be larger than a dimension of the inner notch in the longitudinal direction.

In the door frame according to this disclosure, although a variation of the dimension occurs in the outer member and the inner member, the opening of the weld path is easily exposed to the outside of the door frame.

In the above-described door frame, the weld bead may be provided between the pair of side parts, which are bent toward the inner outside surface, and the inner outside surface.

In the door frame according to this disclosure, the separation distance between the outer folded part and the inner outside surface is shortened by the pair of bent side parts, and the outer folded part and the inner outside surface can be welded with a small amount of the weld bead. Thus, the weld strength is improved.

In the above-described door frame, a dimension of the weld bead in the longitudinal direction may be larger than the dimension of the outer notch in the longitudinal direction.

In the door frame according to this disclosure, the entire body of the edge forming the outer notch is welded to the inner member. Thus, the weld strength is improved.

According to this disclosure, it is possible to provide the vehicle door frame which has the high weld strength of the inner member with respect to the outer member.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 7A and 7B are views illustrating a modification of the weld-joint part, which is shown in FIG. 4, wherein FIG. 7A is a sectional view illustrating an outer joint part without an outer folded part and an inner joint part, and FIG. 7B is a sectional view illustrating an outer joint part without an outer notch and the inner joint part.

DETAILED DESCRIPTION

Figure 1:
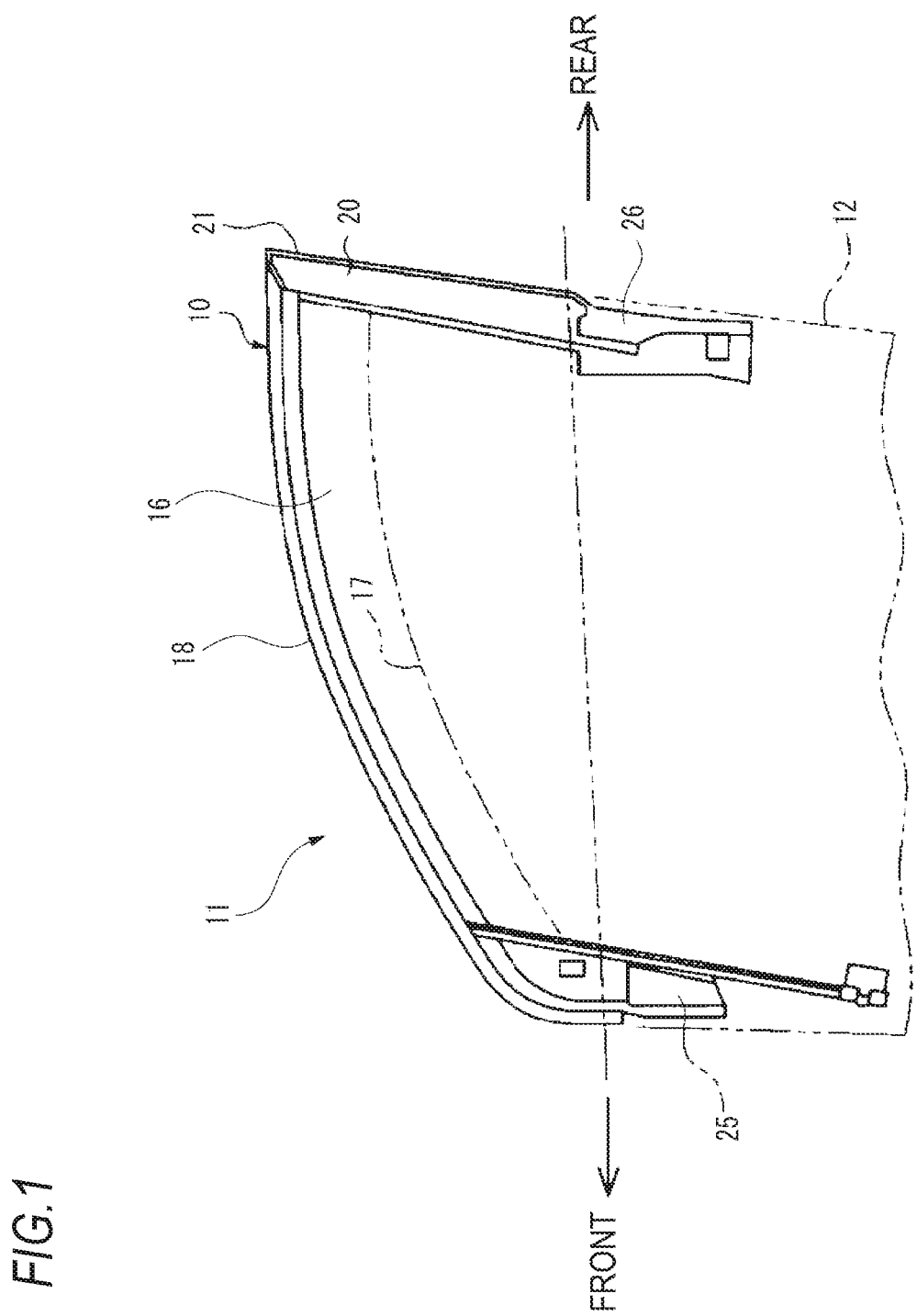
FIG. 1 is a side view illustrating a side door for a front seat with a door frame when viewed from an inboard side.

Hereinafter, an embodiment of a door frame according to this disclosure will be described with reference to the drawings. FIG. 1 is a side view illustrating a side door 11 for a front seat with a door frame 10 when viewed from an inboard side.

As illustrated in FIG. 1, the door frame 10 according to this embodiment configures the side door 11 of the vehicle front seat. The door frame 10 is formed in the upper portion of a door panel 12 (indicated by a two-dot chain line in FIG. 1) to have a frame shape. A door glass 17 is elevated and lowered in a window opening 16 surrounded by an upper edge of the door panel 12 and the inner edge of the door frame 10.

A glass run 28 made of an elastic material is arranged on the inner peripheral side of the door frame 10. The edge of the door glass 17 is held by the glass run 28. The glass run 28 prevents water, dust, and the like from being infiltrated into the vehicle.

The door frame 10 includes an upper sash 18 which forms the upper edge of the door, and a columnar sash 20 which extends upwards from the rear portion of the door panel 12. The rear end of the upper sash 18 and the upper end of the columnar sash 20 are joined in a door corner part 21.

The front lower portion of the upper sash 18 is fixed in the door panel 12 through a mirror bracket 25. The lower portion of the columnar sash 20 is fixed in the door panel 12 through a lock bracket 26. Incidentally, a belt-line reinforcement (not illustrated) which extends in a vehicle longitudinal direction is fixed to the mirror bracket 25 and the lock bracket 26.

When the side door 11 is closed, the upper sash 18 is positioned along a door opening of a roof panel of a vehicle body (not illustrated), and the columnar sash 20 is positioned along a center pillar of the vehicle body. A weatherstrip (not illustrated) made of an elastic material is arranged on the outer peripheral side of the upper sash 18 and the columnar sash 20. When the side door 11 is closed, the weatherstrip is elastically deformed to liquid-tightly close a space between the side door 11 and the vehicle body.

Figure 2:
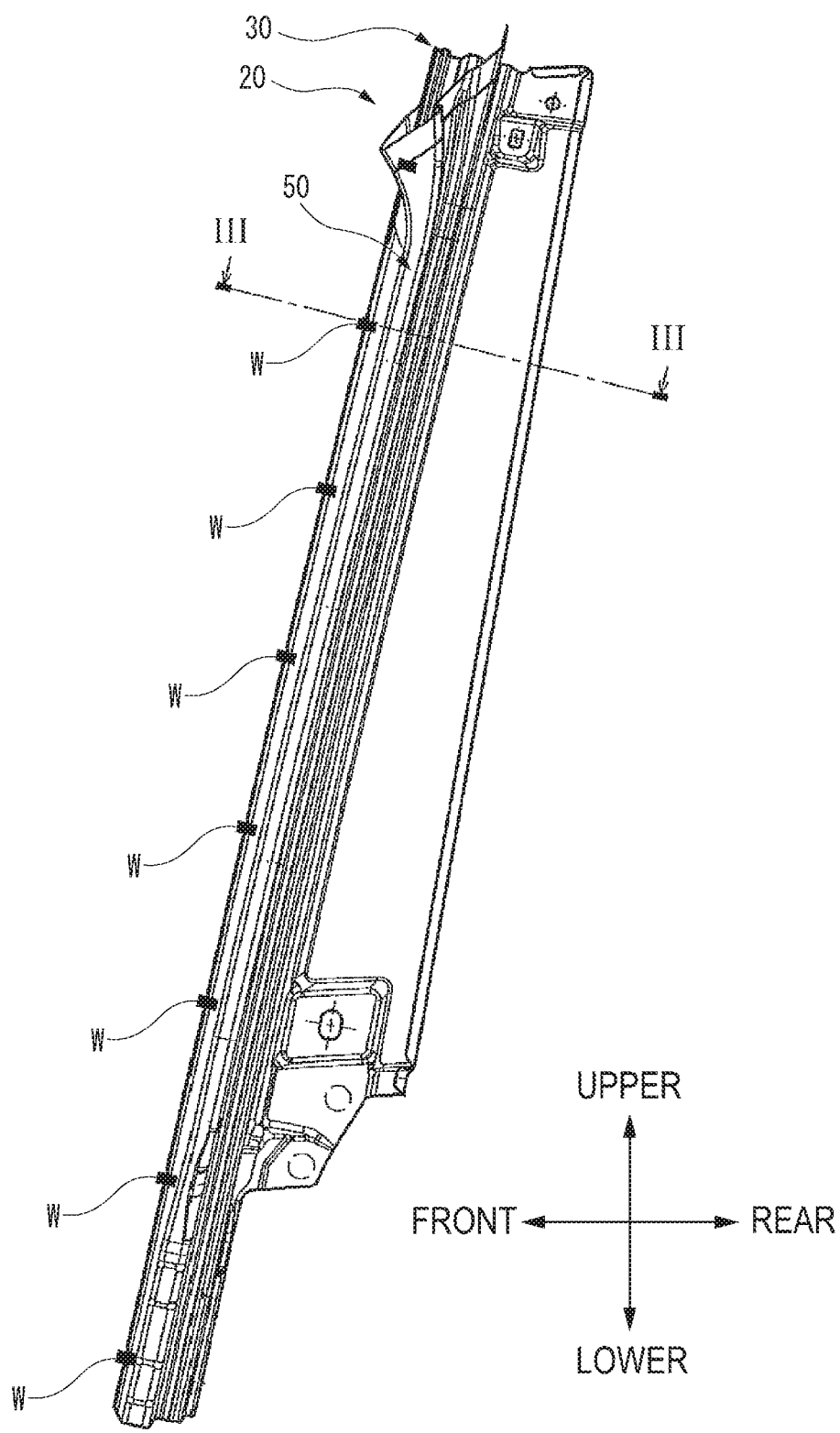
FIG. 2 is a perspective view illustrating a columnar sash configuring the door frame.

FIG. 2 is a perspective view illustrating the columnar sash 20 configuring the door frame 10. As illustrated in FIG. 2, the columnar sash 20 of the door frame 10 is configured by combining the outer member 30 and the inner member 50.

The outer member 30 is formed in the shape of a long member by roll-forming, for example, a planar metal material (for example, iron, aluminum, and SUS). The inner member 50 is formed in the shape of a long member by press-forming a planar metal material (for example, iron, aluminum, and SUS) similar to the outer member 30. The inner member 50 is integrally formed in the outer member 30 by welding in a plurality of welding portions W with intervals in a longitudinal direction.

Figure 3:
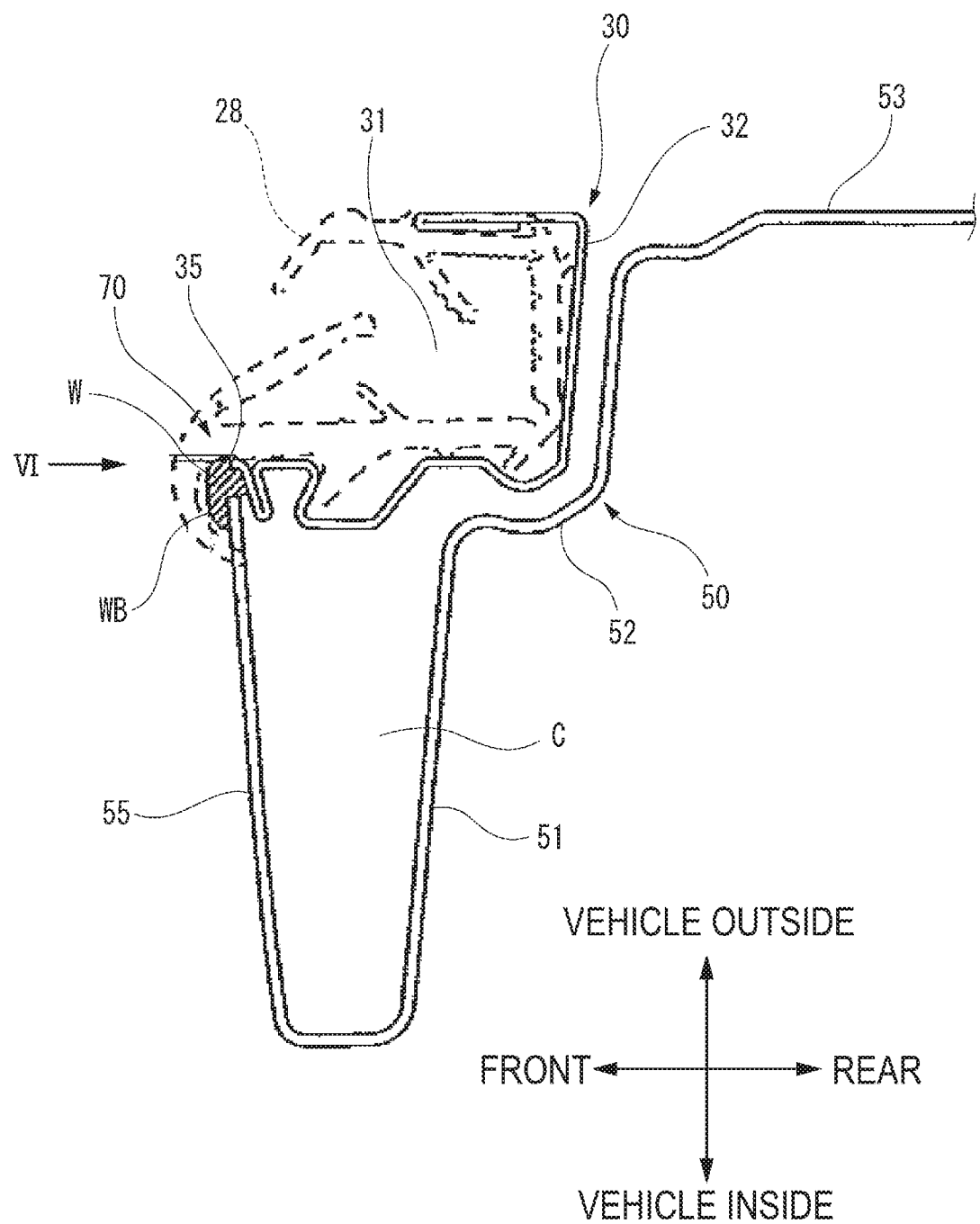
FIG. 3 is a sectional view taken along line III-III of FIG. 2.

FIG. 3 is a sectional view taken along line III-III of FIG. 2. As illustrated in FIG. 3, the outer member 30 has a groove formation part 32 which forms a groove-shaped glass run storage part 31. The glass run 28 is fitted and holded in the glass run storage part 31 of the groove formation part 32.

The inner member 50 has a main body 51 which has a substantially U-shaped cross-section, an extension part 52 which extends from the main body 51, and a design part 53 which is bent from the extension part 52 to be exposed to the outside.

In the outer member 30, the edge of the groove formation part 32 on a vehicle inside serves as an outer joint part 35. In the inner member 50, a wall of the main body 51 opposite to the extension part 52 serves as an inner joint part 55. In the inner member 50, the inner joint part 55 is welded with respect to the outer joint part 35 of the outer member 30 in the plurality of welding portions W provided with the intervals in the longitudinal direction. In other words, the door frame 10 has a weld-joint part 70 in which the inner member 50 is joined to the outer member 30 with a weld bead WB in the plurality of welding portions W in the longitudinal direction.

Next, the description will be given about a structure of the weld-joint part 70 in which the outer joint part 35 of the outer member 30 is welded and joined to the inner joint part 55 of the inner member 50.

Figure 4:
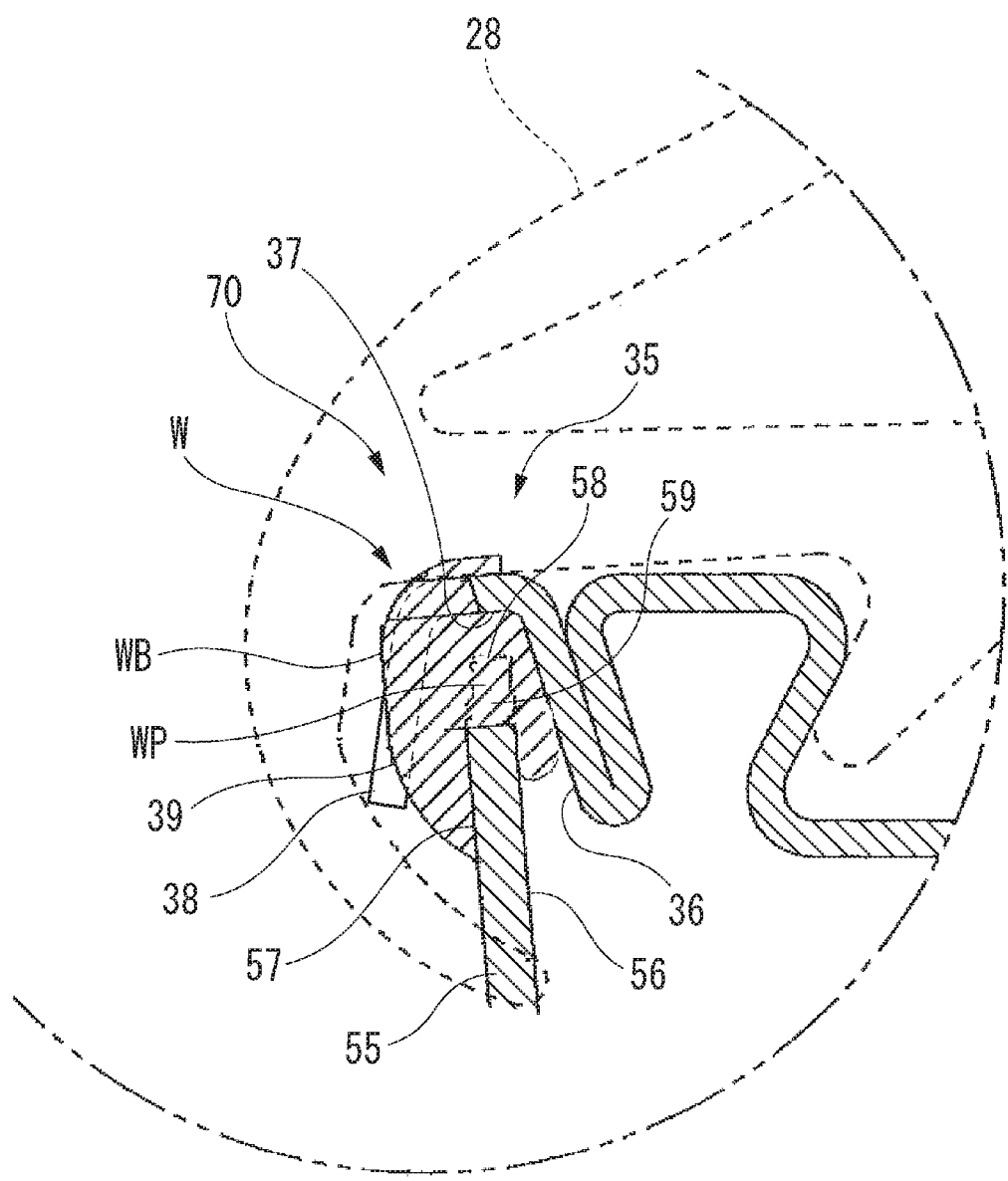
FIG. 4 is an enlarged view illustrating a weld-joint part of FIG. 3.

FIG. 4 is an enlarged view illustrating the weld-joint part 70 of FIG. 3. As illustrated in FIG. 4, in the cross-section of the weld-joint part 70 orthogonal to the longitudinal direction, the inner joint part 55 has an inner inside surface 56, an inner outside surface 57 which is positioned outside the door frame 10 from the inner inside surface 56, and an inner side surface 58 which connects the inner inside surface 56 and the inner outside surface 57. Incidentally, herein, the outside of the door frame 10 indicates a direction toward the outside of a closed space C configured by the outer member 30 and the inner member 50. As illustrated in FIG. 4, in the case of the front side door, the left side in FIG. 4 corresponds to the outside of the door frame 10. Incidentally, in a case of a rear side door, a cross-section thereof is bilaterally symmetrical to FIG. 4, and the outside of the vehicle frame 10 is reversed to that of the front side door of FIG. 4.

The outer joint part 35 has an outer inside surface 36 which faces the inner inside surface 56 with a gap, and an outer side surface 37 which faces the inner side surface 58. The outer inside surface 36 is formed by folding the vicinity of the edge of the outer joint part 35 inwards the door frame 10. At least a portion of the inner joint part 55 is disposed with respect to the outer joint part 35 with a gap between the inner side surface 58 and the outer side surface 37. In the portion other than at least the portion of the inner joint part 55, the inner side surface 58 abuts on the outer side surface 37 without any gap. Accordingly, for example, infiltration of water is effectively prevented. In the portion other than at least the portion of the inner joint part 55, however, the inner side surface 58 may abut on the outer side surface 37 with a gap.

Figure 5:
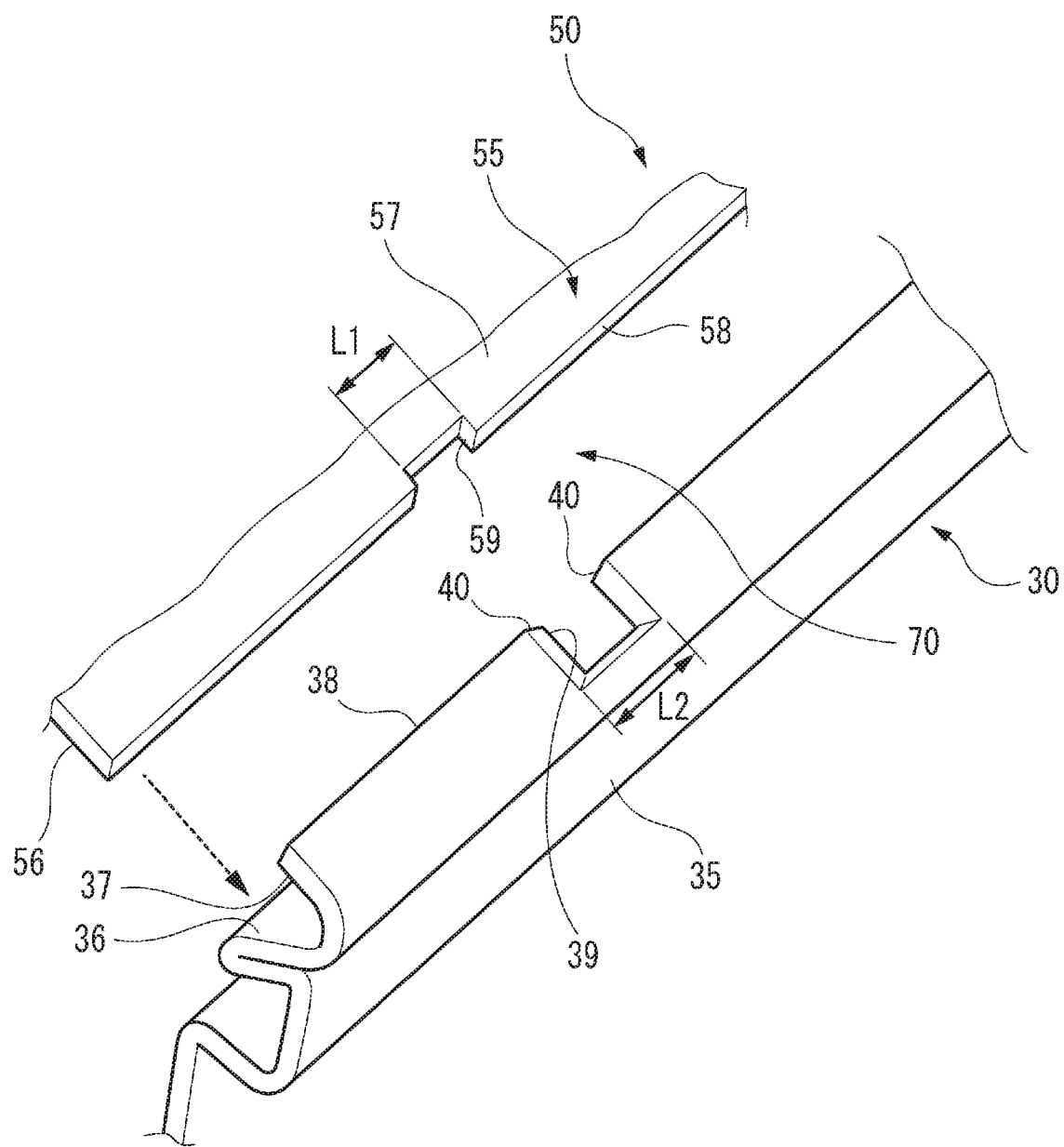
FIG. 5 is a perspective view illustrating an outer joint part and an inner joint part which are joined to each other.
Figure 6:
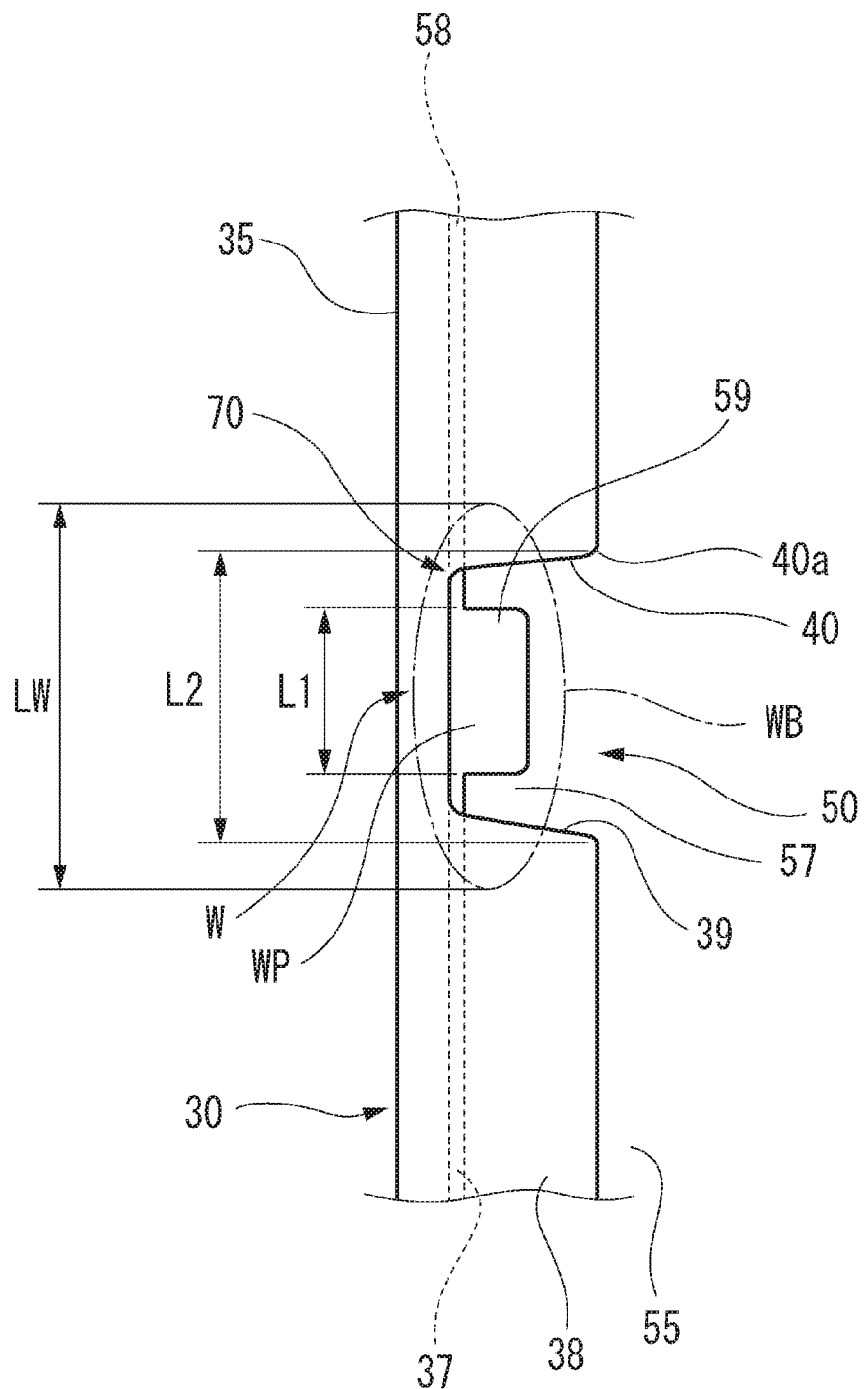
FIG. 6 is a view as seen from a direction of an arrow VI in FIG. 3.

FIG. 5 is a perspective view illustrating the outer joint part 35 and the inner joint part 55 which are joined to each other. FIG. 6 is a view as seen from a direction of an arrow VI in FIG. 3. As illustrated in FIGS. 5 and 6, in the weld-joint part 70, in the welding portions W, an inner notch 59 is provided at the outer edge of the inner joint part 55. By the inner notch 59, a weld path WP which communicates inwards from the outside of the door frame 10 is formed between the inner side surface 58 and the outer side surface 37. In addition, an outer folded part 38 is formed in the outer joint part 35 by folding the edge thereof toward the inside of the door frame 10. The outer folded part 38 is continuous from the outer side surface 37 and extends to face the inner outside surface 57.

In the weld-joint part 70, the weld path WP which is formed between the inner side surface 58 and the outer side surface 37 is filled with the weld bead WB. The weld bead WB formed to fill the weld path WP is attached to the inner outside surface 57, the inner side surface 58, the inner inside surface 56, the outer folded part 38, the outer side surface 37, and the outer inside surface 36.

In the outer joint part 35, an outer notch 39 is formed in the outer edge of the outer folded part 38. The outer notch 39 is provided to be positioned in overlap with the inner notch 59. Accordingly, in the weld-joint part 70, before welding, the opening of the weld path WP is exposed to the outside of the door frame 10.

A pair of side parts 40 forming the outer notch 39 is bent toward the inner outside surface 57. Accordingly, a separation distance between the outer folded part 38 and the inner outside surface 57 is shortened by the pair of bent side parts 40. In addition, the pair of side parts 40 does not protrude outwards so that the outer member 30 is easily handled. Incidentally, in the welding portions W, the weld bead WB is also provided between the pair of side parts 40 which are bent toward the inner outside surface 57 and the inner outside surface 57.

A dimension L2 of the outer notch 39 in the longitudinal direction is larger than a dimension L1 of the inner notch 59 in the longitudinal direction. In the longitudinal direction, the inner notch 59 is disposed in the outer notch 39.

In the weld bead WB, a dimension Lw in the longitudinal direction is larger than the dimension L2 of the outer notch 39 in the longitudinal direction. Accordingly, the entire body of the edge forming the outer notch 39 is welded to the inner member 50.

When the inner joint part 55 of the inner member 50 is joined to the outer joint part 35 of the outer member 30 in order to produce the door frame 10, first, the inner joint part 55 is disposed in a predetermined position of the outer joint part 35, and the inner notch 59 of the inner joint part 55 is disposed in the outer notch 39 of the outer joint part 35.

In this state, the weld path WP which is formed from the outside of the outer member 30 by the inner notch 59 such that the opening is exposed to the outside is welded to be filled with the weld bead WB. Such a welding operation is performed in each of the welding portions W. In this manner, the inner member 50 is joined to the outer member 30 in the welding portions W so as to obtain the door frame 10 in which the outer member 30 is integrated with the inner member 50.

Incidentally, in order to form a sufficient amount of the weld bead WB, the inner joint part 55 and the outer joint part 35 are preferably joined by MAG (Metal Active Gas) welding, MIG (Metal Inert Gas) welding, or TIG (Tungsten Inert Gas) welding.

Hereinbefore, as described above, in the door frame 10 according to this embodiment, in the welding portion W, the weld path WP formed by providing the inner notch 59 in the outer edge of the inner joint part 55 is filled with the weld bead WB. Therefore, the inner joint part 55 of the inner member 50 is welded to the outer joint part 35 of the outer member 30 in three surfaces of the inner outside surface 57, the inner side surface 58, and the inner inside surface 56. Thus, it is possible to improve the weld strength of the inner member 50 with respect to the outer member 30.

Particularly, in the door frame 10 according to this embodiment, the weld bead WB is also attached to the outer folded part 38 of the outer joint part 35, and thus the weld strength of the inner member 50 and the outer member 30 can be improved further.

Incidentally, when the weld bead WB is attached to the side surface or the outside surface of the outer folded part 38, the weld strength of the inner member 50 and the outer member 30 can be improved further.

In the door frame 10 according to this embodiment, in the outer edge of the outer folded part 38, the outer notch 39 is provided to be positioned in overlap with the inner notch 59, so that the opening of the weld path WP is exposed to the outside of the door frame 10. Thus, the welding operation is easily performed.

In the door frame 10 according to this embodiment, the pair of side parts 40 of the outer notch 39 is bent toward the inner outside surface 57. Therefore, the pair of side parts 40 does not protrude outward, so that the outer member 30 is easily handled.

In the door frame 10 according to this embodiment, the dimension L2 of the outer notch 39 in the longitudinal direction is larger than the dimension L1 of the inner notch 59 in the longitudinal direction. For this reason, although the variation of the dimension occurs in the outer member 30 and the inner member 50, the opening of the weld path WP is easily exposed to the outside of the door frame 10.

In the door frame 10 according to this embodiment, the separation distance between the outer folded part 38 and the inner outside surface 57 is shortened by the pair of bent side parts 40. For this reason, the outer folded part 38 and the inner outside surface 57 can be welded with a small amount of the weld bead WB, and the weld strength is improved.

In the door frame 10 according to this embodiment, the dimension Lw of the weld bead WB in the longitudinal direction is larger than the dimension L2 of the outer notch 39 in the longitudinal direction. Accordingly, the entire body of the edge forming the outer notch 39 is welded to the inner member 50, and thus the weld strength is improved.

Incidentally, in the above-described embodiment, the outer folded part 38 having the outer notch 39 is provided at the outer joint part 35 of the outer member 30. However, the door frame 10 is not limited to the configuration that the outer folded part 38 and the outer notch 39 are provided at the outer joint part 35.

For example, as illustrated in FIG. 7A, the outer folded part 38 may not be provided at the outer joint part 35. Also in such a door frame 10, the weld path WP is filled with the weld bead WB. Thus, the inner joint part 55 of the inner member 50 is welded to the outer joint part 35 of the outer member 30 in three surfaces of the inner outside surface 57, the inner side surface 58, and the inner inside surface 56, so as to improve the weld strength of the inner member 50 with respect to the outer member 30.

As illustrated in FIG. 7B, the outer folded part 38 without the outer notch 39 may be provided at the outer joint part 35. Also in such a door frame 10, the weld path WP is filled with the weld bead WB, and the weld bead WB is also attached to the outer folded part 38. Thus, it is possible to further improve the weld strength of the inner member 50 with respect to the outer member 30.

Incidentally, in the above-described embodiment, the structure of the welding portion W in the columnar sash 20 of the door frame 10 has been described as an example. However, also in the upper sash 18 of the door frame 10, the outer member 30 and the inner member 50 may be welded to have the similar structure.

The welding structure of the door frame 10 of the above-described embodiment may be applied to all the joint portions of the outer joint part 35 of the outer member 30 and the inner joint part 55 of the inner member 50, and may be applied to at least one portion of the joint portions.

The weld-joint part 70 in which the outer member 30 and the inner member 50 are joined may form a portion of the glass run storage part 31, and may be a portion separated from the glass run storage part 31.

What is claimed is:

1. A door frame having a glass run storage part storing a glass run, the door frame comprising:
   an outer member, and
   an inner member welded to the outer member,
   wherein an outer joint part of the outer member and an inner joint part of the inner member are welded at a plurality of welding portions along a longitudinal direction in which the glass run storage part extends,
   wherein, in a cross-section orthogonal to the longitudinal direction;
      the inner joint part includes an inner inside surface, an inner outside surface, which is positioned on an outside of the door frame than the inner inside surface, and an inner side edge, which connects the inner inside surface and the inner outside surface; and
      the outer joint part includes, at least, an outer inside surface, which faces the inner inside surface with a gap, and an outer side surface, which includes a facing part facing the inner side edge,
   wherein, in at least one of the welding portions, an inner notch is provided at an outer edge of the inner joint part, and a weld path, which communicates inwards from the outside of the door frame, is formed between the inner side edge and the outer side surface by the inner notch, and
   wherein a weld bead, which is formed to fill at least the weld path, is directly attached to the inner outside surface, the inner side edge, the inner inside surface, the facing part, which faces the inner side edge of the outer side surface, and the outer inside surface.

2. The door frame according to claim 1, wherein the outer joint part includes an outer folded part which is continuous from the outer side surface and extends to face the inner outside surface, and
   wherein, in at least one of the welding portions, the weld bead, which is formed to fill the weld path, is attached to the outer folded part.

3. The door frame according to claim 2, wherein, in an outer edge of the outer folded part, an outer notch is provided to be positioned to overlap with the inner notch.

4. The door frame according to claim 3, wherein a pair of side parts forming the outer notch is bent toward the inner outside surface.

5. The door frame according to claim 3, wherein a dimension of the outer notch in the longitudinal direction is larger than a dimension of the inner notch in the longitudinal direction.

6. The door frame according to claim 4, wherein the weld bead is provided between the pair of side parts, which are bent toward the inner outside surface, and the inner outside surface.

7. The door frame according to claim 3, wherein a dimension of the weld bead in the longitudinal direction is larger than a dimension of the outer notch in the longitudinal direction.

8. The door frame according to claim 1, wherein the weld bead is attached to a part, which faces the inner inside surface of the outer inside surface and a part, which faces the outer inside surface of the inner inside surface.

* * * * *